United States Patent
Chen et al.

(10) Patent No.: US 9,304,232 B2
(45) Date of Patent: Apr. 5, 2016

(54) SHEET FOR LED LIGHT COVER APPLICATION

(75) Inventors: Zhe Chen, Shanghai (CN); Yafeng Sun, Shanghai (CN); Adel Fawzy Bastawros, Newburgh, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 212 days.

(21) Appl. No.: 13/610,809

(22) Filed: Sep. 11, 2012

(65) Prior Publication Data
US 2014/0071695 A1   Mar. 13, 2014

(51) Int. Cl.
| | |
|---|---|
| F21V 5/00 | (2015.01) |
| F21V 3/00 | (2015.01) |
| G03B 21/60 | (2014.01) |
| G02B 17/00 | (2006.01) |
| G02B 27/00 | (2006.01) |
| F21V 11/00 | (2015.01) |
| G02B 3/00 | (2006.01) |
| G02B 5/02 | (2006.01) |

(52) U.S. Cl.
CPC ........... *G02B 3/0056* (2013.01); *G02B 5/0215* (2013.01); *G02B 5/0242* (2013.01); *G02B 5/0278* (2013.01)

(58) Field of Classification Search
CPC .. G02B 5/0278; G02B 5/0242; G02B 6/0051; G02B 5/0221; G02B 5/0226; G02B 5/0231; G02B 5/0215; C08L 83/06; C08L 83/08; F21Y 2101/02; B32B 2264/025; C08G 77/04
USPC ............. 362/311.02, 311.03, 311.06–311.08, 362/311.1, 311.14, 330, 331, 355, 333, 334, 362/336–340; 359/452–457, 599, 591, 592, 359/593
See application file for complete search history.

(56) References Cited

U.S. PATENT DOCUMENTS

| | | | | |
|---|---|---|---|---|
| 5,196,960 A | * | 3/1993 | Matsuzaki et al. | 359/453 |
| 5,764,315 A | * | 6/1998 | Yokota et al. | 349/62 |
| 6,290,364 B1 | * | 9/2001 | Koike et al. | 362/620 |
| 6,878,436 B2 | | 4/2005 | Reilly et al. | |
| 7,297,380 B2 | * | 11/2007 | Coenjarts et al. | 428/1.3 |
| 7,338,184 B2 | * | 3/2008 | Chen et al. | 362/246 |
| 7,401,967 B2 | * | 7/2008 | Wei et al. | 362/626 |

(Continued)

OTHER PUBLICATIONS

"Tospearl Microspheres" accessed from http://www.momentive.com/WorkArea/DownloadAsset.aspx?id=26614 on Jun. 13, 2014, p. 1.*

(Continued)

*Primary Examiner* — Evan Dzierzynski
*Assistant Examiner* — Erin Kryukova
(74) *Attorney, Agent, or Firm* — Cantor Colburn LLP (57) ABSTRACT

Disclosed herein is a sheet comprising a polymeric material; light diffusing particles disposed in the polymeric material; and a non-random surface texture on a surface of the sheet; wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing. The sheet has excellent hiding power and transmission at the same time and is suitable for LED light cover applications. The unit structures have an aspect ratio of 0.15 to 0.5 and a pitch of greater than or equal to 100 μm.

20 Claims, 5 Drawing Sheets

(56) References Cited

U.S. PATENT DOCUMENTS

| | | | |
|---|---|---|---|
| 7,582,720 B2 | 9/2009 | Rudiger et al. | |
| 7,594,733 B2 * | 9/2009 | Goto | 362/97.1 |
| 7,708,446 B2 * | 5/2010 | Zhou et al. | 362/618 |
| 7,808,706 B2 | 10/2010 | Fadel et al. | |
| 7,859,611 B2 * | 12/2010 | Jang et al. | 349/64 |
| 2001/0030638 A1 * | 10/2001 | Kashima | 345/102 |
| 2006/0227323 A1 | 10/2006 | Goto | |
| 2006/0263545 A1 | 11/2006 | Coenjarts et al. | |
| 2008/0062525 A1 * | 3/2008 | Cheng | 359/599 |
| 2008/0123193 A1 * | 5/2008 | Hsu et al. | 359/599 |
| 2008/0123194 A1 * | 5/2008 | Hsu et al. | 359/599 |
| 2008/0138579 A1 | 6/2008 | Hsu et al. | |
| 2008/0218659 A1 * | 9/2008 | Kanaya et al. | 349/64 |
| 2008/0225207 A1 * | 9/2008 | Kim et al. | 349/95 |
| 2008/0232132 A1 | 9/2008 | Graf et al. | |
| 2009/0097229 A1 | 4/2009 | Wood et al. | |
| 2009/0135501 A1 * | 5/2009 | Lee et al. | 359/707 |
| 2009/0161221 A1 * | 6/2009 | Yang et al. | 359/599 |
| 2009/0284686 A1 * | 11/2009 | Joo et al. | 349/64 |
| 2009/0284970 A1 | 11/2009 | Graf et al. | |
| 2009/0296021 A1 | 12/2009 | Lee et al. | |
| 2009/0316261 A1 * | 12/2009 | Garcia-Leiner et al. | 359/453 |
| 2010/0085735 A1 * | 4/2010 | Kim et al. | 362/97.2 |
| 2010/0245715 A1 * | 9/2010 | Watanabe et al. | 349/64 |
| 2011/0042700 A1 * | 2/2011 | Lenk | 257/98 |
| 2012/0212828 A1 * | 8/2012 | Cho et al. | 359/619 |

OTHER PUBLICATIONS

Gurel et al.; "Developement of Polycarbonate Diffuser Films for Liquid Crystal Displays"; Display and Optical Films, GE Plastics, Mt. Vernon, IN; GE Global Research, Niskayuna, NY; http://www.pod-sabic-ip.com/KBAM/Reflection/Assets/15349.pdf; Published: Nov. 2006; 5 Pages.

Holotools; "MicroLens Array Molds"; Holotools GmbH, Freiburg, Germany; Innox Co., Ltd., Aichi, Japan; http://typo3.holotools.de/index.php?id=75; Updated Jan. 2012; 1 Page.

International Search Report; International Application No. PCT/US2013/058673; International Filing Date: Sep. 9, 2013; Date of Mailing: Nov. 22, 2013; 5 Pages.

Written Opinion of the International Searching Authority; International Application No. PCT/US2013/058673; International Filing Date: Sep. 9, 2013; Date of Mailing: Nov. 22, 2013; 5 Pages.

* cited by examiner

SHEET FOR LED LIGHT COVER APPLICATION

BACKGROUND

This disclosure generally relates to polymeric sheets, more specifically to polymeric sheets for light emitting diode (LED) light cover applications.

Hiding power and light transmission are two important parameters for optical performance of a sheet for LED light cover applications. Although light diffusing particles (diffuser) in the sheet may improve the hiding power to some extent, the improvement is limited, typically at the expense of light transmission. Specifically, to achieve a reasonable hiding power performance, a certain amount of diffuser loading is required. The required diffuser loading to attain a desired hiding power increases as the sheet thickness decreases. For sheets having a thickness below 0.5 mm, the required diffuser loading can reach as high as 0.5 wt % for silicone based diffuser and 1 wt % for polymethyl methacrylate (PMMA) based diffuser, which makes it very difficult to obtain balanced hiding power and light transmission economically.

Accordingly, a continual need exists in the art for improved polymeric sheets, especially thin polymeric sheets having good hiding power and light transmission, which are suitable for LED light cover applications.

BRIEF DESCRIPTION

Disclosed herein is a sheet comprising a polymeric material; light diffusing particles disposed in the polymeric material; and a non-random surface texture formed by unit structures on a surface of the sheet; wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing. The unit structures can have an aspect ratio of 0.15 to 0.5 and a pitch of greater than or equal to 100 µm.

Also disclosed is a LED lighting system comprising a LED light source; and a LED light cover adjacent to the LED light source; wherein the LED light cover comprises a sheet comprising a polymeric material; light diffusing particles disposed in the polymeric material; and a non-random surface texture formed by unit structures on a surface of the sheet; wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing. The unit structures can have an aspect ratio of 0.15 to 0.5 and a pitch of greater than or equal to 100 µm.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Surface roughness can cause diffusion and/or reflection when light beam pass through the sheets, thus potentially improving hiding power performance of the sheets. Random textures can be used (e.g., surface roughness) to potentially enhance hiding power, but the enhancement is not significant when considered in view of the reduction in light transmission.

To achieve uniform light distribution across the face of backlight module and to hide the light source, which could be CCFL light tubes, polymeric sheets loaded with diffusers and sometimes also with lenticular (semi cylindrical) or prismatic textures could be used. However, these types of textures are only effective to diffuse light in the direction perpendicular to the light bar and almost have no effect in the direction parallel to the light bar thus making them unsuitable for LED lighting applications since these applications use light diffusion in all directions. For example, a 1.2 mm standard lenticular diffuser plate used in LCD backlight module gives Degree of Light Distribution (DLD) hiding power of only 4.7°, which can hardly be used in LED lighting applications. Surface textures for LCD applications are linear and continuous at one dimension, which fails to provide the hiding power and light transmission combination desired herein.

A synergistic effect has been discovered with a sheet having surface texture and comprising diffusion particles. It has been discovered that a sheet comprising light diffusing particles and a specific surface texture (e.g., non-random) including certain structure units provides good hiding power and light transmission at the same time. Specifically, it has been found that the hiding power performance of such a sheet is better than the cumulative hiding power performances of the sheet having diffusing particles but no surface textures and the sheet having a surface texture but no diffusing particles.

The sheet can have a thickness of less than or equal to 4 millimeters (mm), specifically, 0.5 mm to about 4 mm, more specifically, 0.8 mm to 1.5 mm. Below 0.5 mm, the stiffness of the sheet is not sufficient. Above 4 mm, the replication of surface texture may not be high enough to obtain hiding power and transmission synergy. In the instance where the sheet is made through melt calendaring process, advantageously, the sheet has a thickness of less than 1.5 mm, e.g., in order to obtain consistent surface texture replication.

Figure 1:
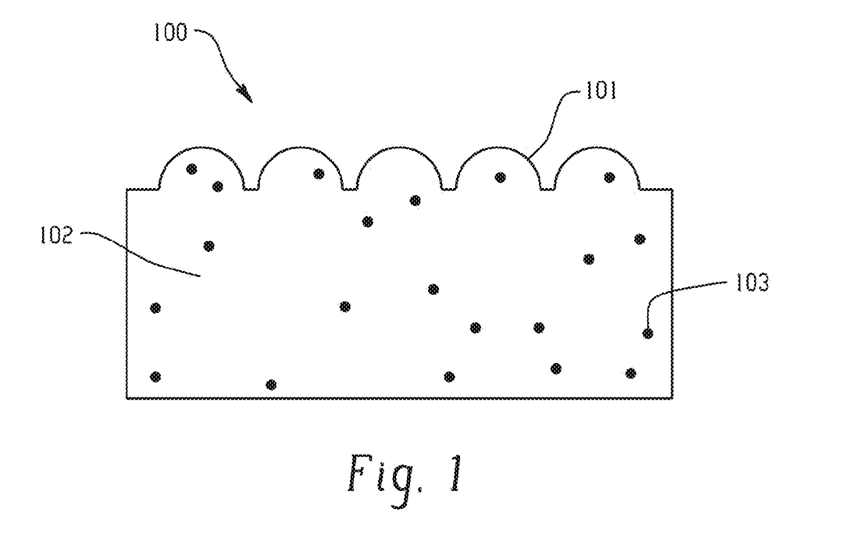
FIG. 1 is a cross section view of a monolithic sheet having light diffusing particles and a surface texture.

The sheet can be a monolithic sheet formed by a polymeric material loaded with light diffusing particles. As such, the surface texture of the sheet may contain diffusing particles. An exemplary monolithic sheet is illustrated in FIG. 1. As shown in FIG. 1, monolithic sheet 100 comprises polymeric material 102, light diffusing particles 103 disposed in the polymeric material, and a microlens surface texture 101 on a surface of the sheet.

Figure 2:
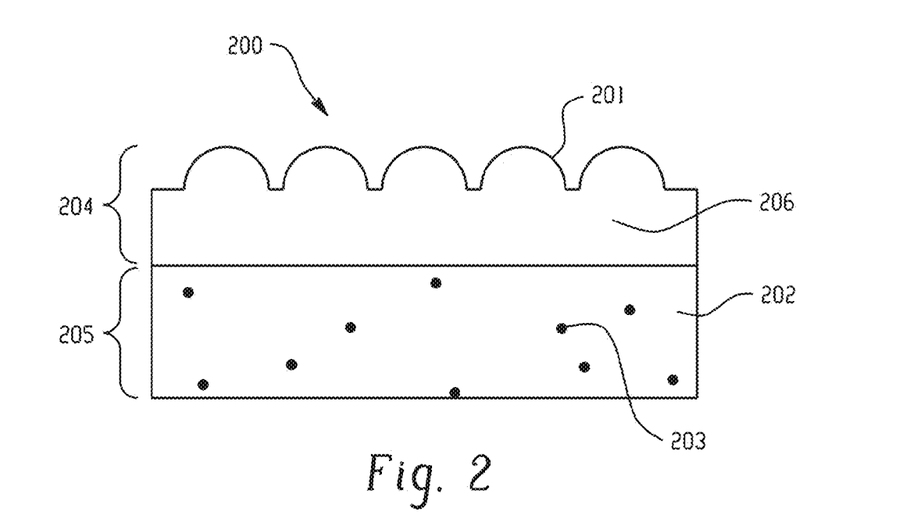
FIG. 2 is a cross section view of a two layer co-extruded sheet having light diffusing particles in the base layer and a surface texture on the surface texture layer.

Alternatively, the sheet can have multiple layers (e.g., two layers—a base layer and a surface texture layer disposed on the base layer). The base layer can be formed from a first polymeric material loaded with light diffusing particles. The surface texture layer can be formed from a second polymeric material which is not loaded with any light diffusing particles. The first and the second polymeric materials can be the same or different. The surface texture layer contains the surface texture of the sheet. It can have a thickness of 0.03 mm to 0.07 mm, specifically 0.04 mm to 0.06 mm. An exemplary two layer coextruded sheet is illustrated in FIG. 2. As shown in FIG. 2, sheet 200 has a base layer 205 and a surface texture layer 204 which is disposed on base layer. The base layer comprises a first polymeric material 202 and diffusing particles 203 disposed in the first polymeric material. The surface texture layer comprises a second polymeric material 206 and a surface texture 201.

Polymeric materials for the sheet (e.g., for the base layer and surface texture layer) include, but are not limited to, polycarbonates, acrylic resins, polyesters, polyolefins, polyvinyl chloride, an epoxy resin, a styrene resin, a fluorine resin, cellulosic resins, urethane resins, phenol resins, melamine resins, as well as and combinations comprising at least one of the forgoing polymeric materials, such as acrylonitrile-butadiene-styrene (ABS) resin. Examples of acrylic resins include poly(methylacrylate) and poly(methylmethacrylate). Examples of polyolefin resins include polyethylene resins and polypropylene resins.

Light diffusing particles can be acrylic based (such as poly(acrylates), e.g., poly(alkyl methacrylates) (such as poly(methyl methacrylate) (PMMA)); poly(tetrafluoroethylene) (PTEF); silicones (such as polyorganosilsequioxanes, for example polyalkylsilsequioxanes available under the trade name TOSPEARL® from Momentive Performance Materials Inc.); inorganic materials (such as materials containing antimony, titanium, barium, and zinc, for example the oxides or sulfides of antimony, titanium, barium and zinc); and combinations containing at least one of the forgoing. The alkyl groups in the poly(alkyl methacrylates) and polyalkylsilsequioxanes can contain one to about twelve carbon atoms. The light diffusing particles can also be cross-linked. For example, PMMA can be cross-linked with another copolymer such as polystyrene or ethylene glycodimethacrylate. As the diffusing effect is dependent on the interfacial area between polymer matrix and diffusing particles, the particle size of the diffusing particles is less than or equal to 10 micrometers (μm). For example, the particle size of polyalkylsilsequioxanes can be 1.6 μm to 2.0 μm, and the particle size of cross linked PMMA can be 3 μm to 6 μm.

Diffusing particles can be present in the sheets in an amount of 0.2% to about 0.8% by weight based on the total weight of the sheet. For example, polyalkylsilsequioxanes can be present in an amount of 0.2 wt% to 0.6 wt% based on the total weight of the sheet, and crosslinked PMMA can be present in an amount of 0.4 wt% to 0.8 wt% based on the total weight of the sheet. Compared to sheets having only light diffusing particles but no surface textures, the sheets of this disclosure can contain a lower loading of light diffusing particles yet have a better hiding power performance.

The surface texture of the sheet may be on one or both sides of the sheet. This surface texture is non-random and comprises cells and has multiple axes of symmetry. Possible unit structures include hemispherical structures, partial hemispherical structures, ellipsoidal structures, immersed spherical beads, ellipsoidal beads, "bell-shape" bump, and complex lens shape structures (e.g., convex and/or concave lens), pyramidal structures, reversed pyramidal structures, and combinations comprising at least one of the foregoing.

Figure 6A:
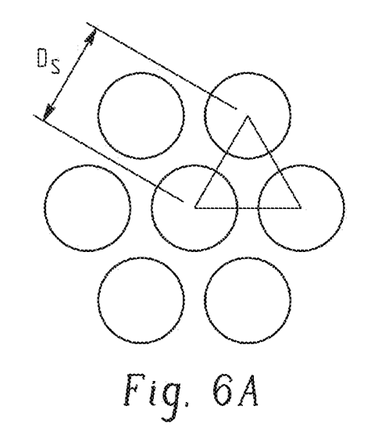
FIG. 6A shows a bird view and FIG. 6B shows a cross section view of a microlens surface texture.
Figure 6B:
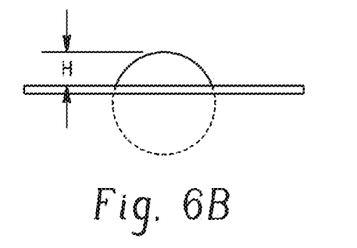

The unit structures can have an aspect ratio of greater than or equal to 0.15, specifically 0.15 to 0.5, more specifically, 0.15 to 0.3, and more specifically, 0.15 to 0.25, e.g., 0.2, wherein the aspect ratio is the height (H) of the unit structure divided by the effective diameter ($D_s$) or pitch of the unit structures. Height and effective diameter of microlens are illustrated in FIGS. 6A and 6B. The unit structures, e.g., cells, can have a pitch of greater than or equal to 100 micrometers (μm), specifically, 100 μm to 300 μm, more specifically, 100 μm to 200 μm, and more specifically, 125 μm to 175 μm. The unit structures can comprise convex and/or concave lens, e.g., having diameters of 100 micrometers to 200 micrometers.

Figure 3:
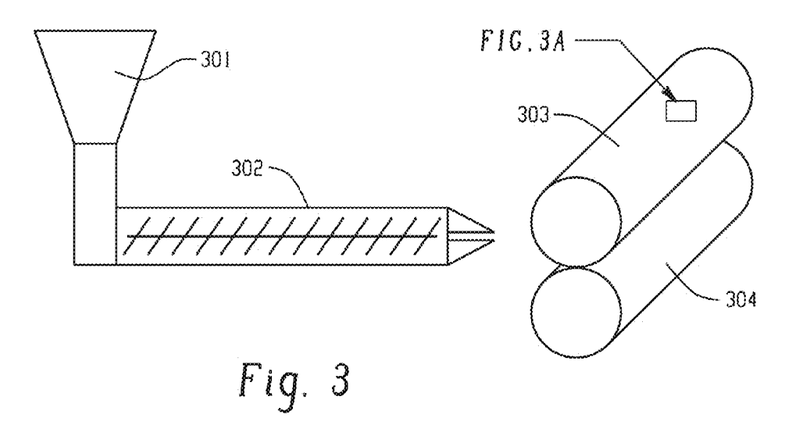
FIG. 3 illustrates a calendaring extrusion system for making some embodiments of the disclosed sheets.
Figure 3A:
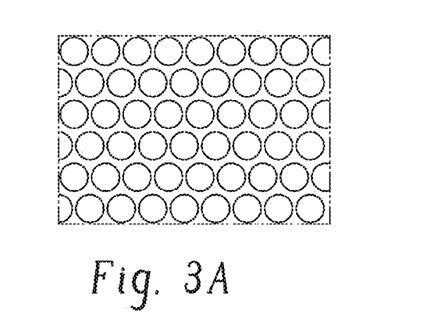
FIG. 3A illustrates the surface texture of the master roller.

The sheets can be made by various methods including calendaring. FIG. 3 illustrates a schematic of an example of a calendaring process. The calendar system has a nip roller pair comprising a master roller 303 with the unit structures (FIG. 3A) on the surface and a compliant roller 304 with matte or polished surface. Polymeric materials can be fed into screw extruder 302 through hoop 301. Molten polymeric web exiting the extruder die can be pushed into the nip between the master roller and compliant roller, where pressure is applied to the melt. Once the web has the replicated texture, it is cooled below glass transition temperature of the polymer, allowing the polymer to solidify while still bearing the unit structures.

The optical performances of the sheets of the disclosure are evaluated by hiding power and transmission parameters.

Figure 5:
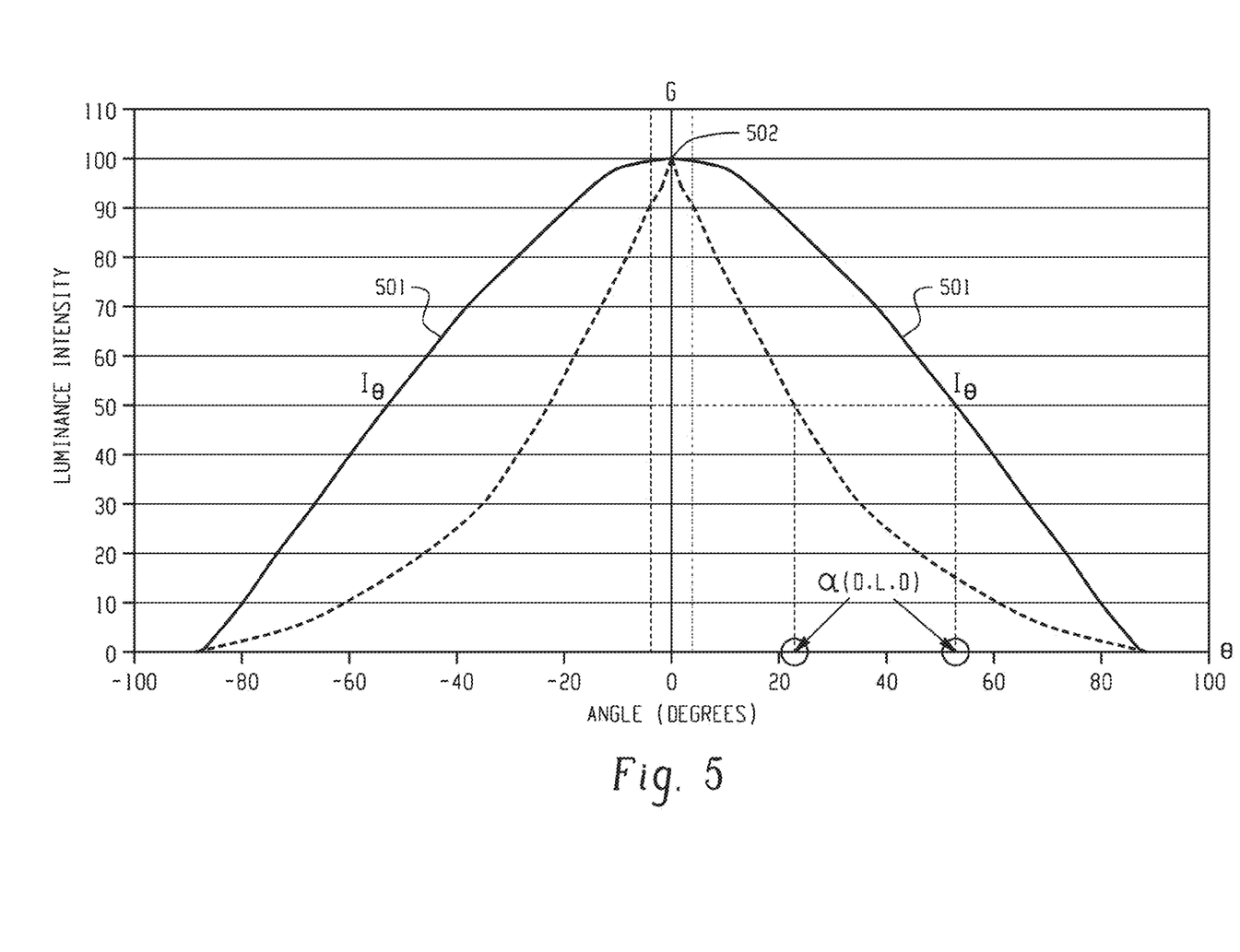
FIG. 5 illustrates the definition of DLD.

The hiding power is the ability to "hide" LED light source from view on the viewing side of the LED light. Degree of light dispersion (DLD) is an index which is widely used in the field to analyze the hiding power quantitatively. DLD is defined in FIG. 5 wherein $I_\theta$ is luminance at a specific receiving angle (θ), G is peak value ($I_p$) or value for receiving angle at 0 degree ($I_0$), and α(DLD) is angle to obtain ½ value of G. In FIG. 5, line 501 illustrates diffuse transmission, while 502 illustrates coherent transmission light.

Figure 4:
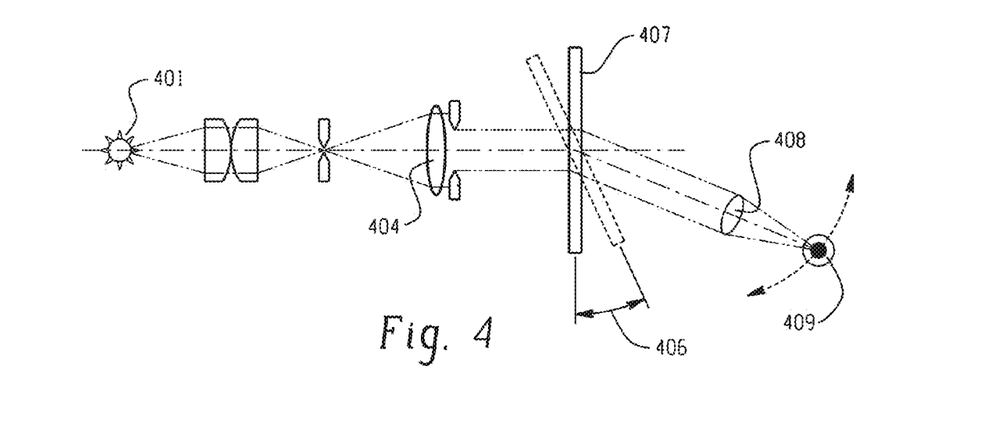
FIG. 4 illustrates the optical structure of a goniophotometer measuring Degree of Light Distribution (DLD).

DLD is measured with a goniophotometer as shown in FIG. 4. As can be seen in FIG. 4, a halogen light source 401 is used in the DLD test and a set of collimator lens 404 are used to transfer the wide angle light into a parallel light beam. The parallel light is usually perpendicular to the sample 407; however an incident angle 406 may exist in some special situation. The parallel light is scattered after passing through the sample 407. The photo detector 409 can measure the luminance intensity by the help of telescope 408 while moving along the arrow from the 0 to 180 degree of the included angle between 407 and 409. The measurements taken herein were on a GP200 goniophotometer.

Transmission is associated with the brightness of the LED light. It can be evaluated by total-light transmittance measured according to ASTM D1003-11e1, Procedure A, with a CIE standard lamp D65 as the light source.

The sheets of this disclosure have good hiding power (DLD of at least greater than or equal to 10 degree for LED down light application and greater than or equal to 30 degree for LED panel light applications, as determined by a goniophotometer) and transmission (greater than or equal to 85% for down light applications and greater than or equal to 60% for panel light applications, as determined in accordance with ASTM D1003-11e1, Procedure A illuminant D65). The sheets can be used for LED light cover applications. Accordingly, a LED lighting system can comprise a LED light source and a LED light cover adjacent to the LED light source, wherein the LED light cover comprises the sheet described herein above.

Disclosed herein is a sheet comprising a polymeric material; light diffusing particles disposed in the polymeric material; and a non-random surface texture formed by unit structures on a surface of the sheet; wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing. The unit structures can have an aspect ratio of 0.15 to 0.5 and a pitch of greater than or equal to 100 µm.

Also disclosed is a LED lighting system comprising a LED light source; and a LED light cover adjacent to the LED light source; wherein the LED light cover comprises a sheet comprising a polymeric material; light diffusing particles disposed in the polymeric material; and a non-random surface texture formed by unit structures on a surface of the sheet; wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing. The unit structures can have an aspect ratio of 0.15 to 0.5 and a pitch of greater than or equal to 100 µm.

In the various embodiments: (i) the sheet has a thickness of 0.5 mm to 4 mm; and/or (ii) the sheet is a monolithic sheet; and/or (iii) the surface texture comprises light diffusing particles; and/or (iv) the sheet contains a base layer and a surface texture layer disposed on the base layer, wherein the base layer is formed by a first polymeric material loaded with light diffusing particles, and wherein the surface texture layer has the surface texture, is formed by a second polymeric material, and contains no light diffusing particles; and/or (v) the light diffusing particles comprise a poly(acrylate), a poly(tetrafluoroethylene), a silicone, an inorganic material, or a combination containing at least one of the foregoing; and/or (vi) the light diffusing particles comprise poly(methyl methacrylate); and/or (vii) the light diffusing particles comprise polyalkylsisequioxanes, wherein the alkyl groups have one to about twelve carbon atoms; and/or (viii) the light diffusing particles are present in an amount of 0.2% to 0.8% by weight based on the total weight of the sheet; and/or (ix) the aspect ratio is 0.15 to 0.3; and/or (x) the aspect ratio is 0.15 to 0.25; and/or (xi) the pitch is 100 µm to 300 µm; and/or (xii) the pitch is 100 µm to 200 µm; and/or (xiii) the pitch is 125 µm to 175 µm; and/or (xiv) the unit structures comprise convex and/or concave lens having diameters of 70 micrometer to 100 micrometers; and/or (xv) when the sheet has a thickness of 0.5 to 4 mm, it has a hiding power of at least 10 degree as determined with a goniophotometer and a transmission of equal to or greater than 60% as determined in accordance with ASTM D1003-11e1(2011), Procedure A, illuminant D65.

The following examples are merely to further illustrate embodiments of sheets, and are not intended to be limiting.

EXAMPLES

Example 1

Polycarbonate (PC) resin loaded with 0.6 wt % of a cross-linked PMMA was fed to a calendar extrusion system for monolithic extrusion. In the extrusion system, the nip roller stack used for calendaring extrusion line comprised of a master roller and a steel roller where the master roller had a ceramic surface engraved with microlens textures comprising lens units having diameters of about 100 micrometers. The thickness of the final sheet product was 1 millimeter (mm).

Offline test results show that the average aspect ratio of the microlens was 0.24. The light transmission and the DLD of the monolithic sheet were 90.5% and 13.3° respectively. In comparison, a 1 mm monolithic extruded sheet made from the same material but without any surface texture had a light transmission of 89.4% with almost no hiding power (DLD was 2.8°).

Example 2

PC resin loaded with 0.2 wt % of silicone beads and PC resin without any dispersing particles (clear PC) were co-extruded in the extrusion system described in Example 1. The flow rates of the PC resin and the clear PC were controlled so that the thickness of the clear PC layer in the final sheet was around 0.05 mm and the total thickness of the sheet was 1 millimeter. The microlens texture was formed on the layer of clear PC.

Offline test results show that the average aspect ratio of the microlens was 0.22. The two-layered sheet had light transmission and DLD of 88.0% and 14.9° respectively. In comparison, a two-layered sheet having the same thickness and made of same materials for the PC and clear PC layers, but without any surface texture, had light transmission of 85.9% with almost no hiding power (DLD was 1.3°).

Example 3

This example illustrates the synergy of hiding power achieved by combining microlens structures and light diffusing particles in a sheet.

Four sheets, labeled as "Diffuser only", "Microlens only", "Diffuser and Microlens (monolithic sheet)" and "Diffuser and Microlens (coextruded sheet)" as shown in Table 1, were made according to the processes described in Examples 1 and 2.

TABLE 1

| Test Item | Diffuser only (comparative) | Microlens only (comparative) | Diffuser and Microlens (monolithic sheet) | Diffuser and Microlens (coextruded sheet) |
|---|---|---|---|---|
| Light diffusing particles | 0.4 wt % of silicone beads | none | 0.4 wt % of silicone beads | 0.4 wt % of silicone beads |
| Surface Texture | none | microlens | microlens | microlens |
| Total thickness of the sheet | 0.8 mm | 0.8 mm | 0.8 mm | 0.8 mm |

Hiding power was measured by DLD method and visual check in real LED light box. The test results are shown in Table 2. The results indicate that the DLD values of "Diffuser Only" and "Microlens Only" samples were very low (1.5° and 6.1° respectively). In contrast, both monolithic and co-extruded (microlens layer was 50 micrometers thick) Diffuser and Microlens sheets had significant increases in DLD hiding power, achieving DLD values of 25.2° and 24.3° respectively, which were significantly more than the combined values of 1.5° and 6.1°. Visual check in real LED light box showed the same phenomenon. Light transmission performances of the monolithic and coextruded Diffuser and Microlens sheets were only slightly affected as compared to those of Diffuser Only and Microlens Only sheets.

TABLE 2

Figure 8A:
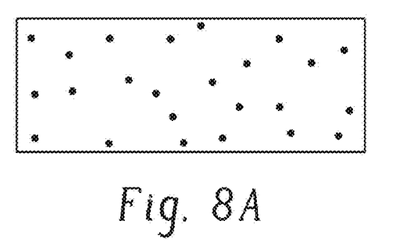
FIG. 8A is a cross section view of a sheet having only diffusing particles.
Figure 8B:
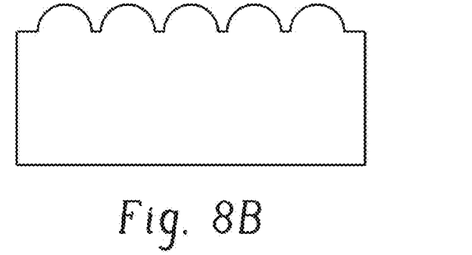
FIG. 8B is a cross section view of a sheet having only surface textures.
Figure 9A:
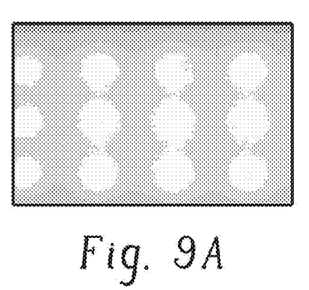
FIG. 9A illustrates the hiding power of a sheet having only diffusing particles.
Figure 9B:
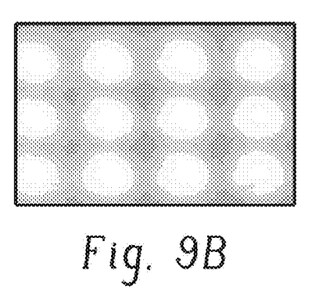
FIG. 9B illustrates the hiding power of a sheet having only surface textures.
Figure 9C:
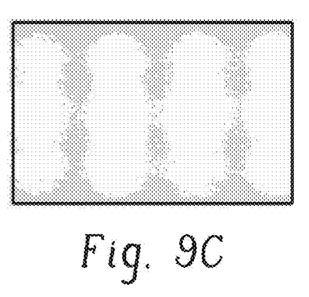
FIG. 9C illustrates the hiding power of a monolithic sheet having both diffusing particles and surface textures.
Figure 9D:
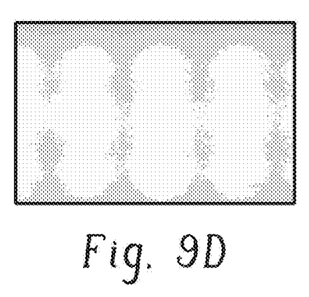
FIG. 9D illustrates the hiding power of a coextruded sheet having both diffusing particles and surface textures.

| Test Item | Diffuser only (comparative) | Microlens only (comparative) | Diffuser and Microlens (monolithic sheet) | Diffuser and Microlens (coextruded sheet) |
|---|---|---|---|---|
| Transmission (%) | 84.6 | 91.8 | 83.4 | 80.6 |
| DLD (°) | 1.5 | 6.1 | 25.2 | 24.3 |
| Sketch of sheet structure | FIG. 8A | FIG. 8B | FIG. 1 | FIG. 2 |
| Hiding Power | FIG. 9A | FIG. 9B | FIG. 9C | FIG. 9D |

Figure 7:
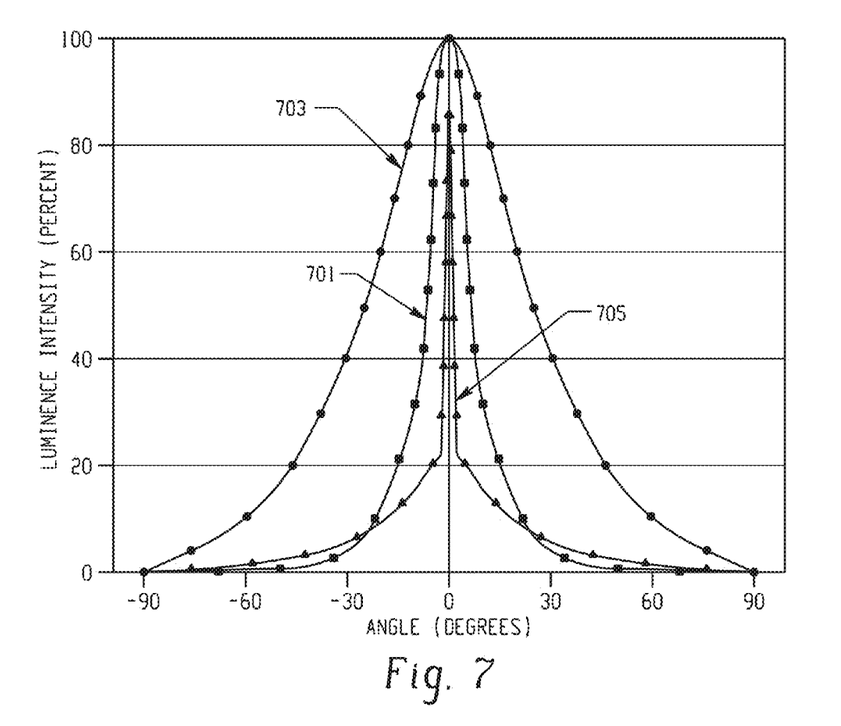
FIG. 7 shows a graphic comparison of light distribution uniformity of sheets having light diffusing particles only, sheets having surface textures only, and sheets having both light diffusing particles and surface textures.

The advantage of the combination of diffusing particle and microlens texture was further demonstrated in FIG. 7. The luminous intensity of transmissive light at different angle verses the axis of incident light can be used to quantitatively describe the uniformity of light distribution across the light cover face. With only microlens texture (without diffusing particles), line 701, most of the light was collimated toward the on-axis direction. With only diffusing particles, line 705, at low loading without any surface texture, the collimation of incident light was only slightly affected and it is still highly concentrated in the on-axis direction. With the combination of diffusing particles and micro-lens texture, line 703, the light was diffused at much broader angles and the luminous intensity uniformity was greatly improved.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A sheet comprising:
a polymeric material;
light diffusing particles disposed in the polymeric material; and
a non-random surface texture formed from unit structures on a surface of the sheet;
wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing;
wherein the unit structures have an aspect ratio of 0.15 to 0.5 and a pitch of greater than or equal to 100 μm;
wherein the light diffusing particles are present in an amount of 0.2% to 0.8% by weight based on a total weight of the sheet and wherein the sheet is a monolithic sheet and has a thickness of 0.5 mm to 4 mm.

2. The sheet of claim 1, wherein the surface texture comprises light diffusing particles.

3. The sheet of claim 1, wherein the light diffusing particles comprise a poly(acrylate), a poly(tetrafluoroethylene), a silicone, an inorganic material, or a combination containing at least one of the foregoing.

4. The sheet of claim 3, wherein the light diffusing particles comprise poly(methyl methacrylate).

5. The sheet of claim 3, wherein the light diffusing particles comprise polyalkylsilsesquioxanes.

6. The sheet of claim 1, wherein the aspect ratio is 0.15 to 0.3.

7. The sheet of claim 6, wherein the aspect ratio is 0.15 to 0.25.

8. The sheet of claim 1, wherein the pitch is 100 μm to 300 μm.

9. The sheet of claim 8, wherein the pitch is 100 μm to 200 μm.

10. The sheet of claim 1, wherein the unit structures comprise at least one of a convex lens and a concave lens having diameters of 70 micrometers to 100 micrometers.

11. The sheet of claim 1, wherein the sheet has a hiding power of at least 10 degree as determined with a goniophotometer and a transmission of equal to or greater than 60% as determined in accordance with ASTM D1003-11e1(2011), Procedure A, illuminant D65.

12. A LED lighting system, comprising:
a LED; and
a LED light cover adjacent to the LED;
wherein the LED light cover comprises a sheet comprising a polymeric material; light diffusing particles disposed in the polymeric material; and a non-random surface texture formed from unit structures on a surface of the sheet;

wherein the surface texture comprises hemispherical structures, partial hemispherical structures, ellipsoidal structures, immersed spherical beads, ellipsoidal beads, "bell-shape" bump, complex lens shape structures, pyramidal structures, reversed pyramidal structures, or combinations comprising at least one of the foregoing;

wherein the unit structures have an aspect ratio of 0.15 to 0.5 and a pitch of greater than or equal to 100 μm; and wherein the light diffusing particles are present in an amount of 0.2% to 0.8% by weight based on a total weight of the sheet and wherein the sheet is a monolithic sheet and has a thickness of 0.5 mm to 4 mm.

13. A sheet comprising:

a polymeric material;

light diffusing particles disposed in the polymeric material; and a non-random surface texture formed from unit structures on a surface of the sheet;

wherein the unit structures have an aspect ratio of 0.15 to 0.5 and a pitch of greater than or equal to 100 μm; and wherein the sheet has a hiding power of at least 10 degree as determined with a goniophotometer; and wherein the light diffusing particles are present in an amount of 0.2% to 0.8% by weight based on a total weight of the sheet and wherein the sheet is a monolithic sheet and has a thickness of 0.5 mm to 4 mm.

14. The sheet of claim 13, wherein the surface texture has multiple axes of symmetry.

15. The sheet of claim 1, wherein the sheet has a thickness between 0.8-1.5 mm.

16. The LED lighting system of claim 12, wherein the sheet has a thickness between 0.8-1.5 mm.

17. The sheet of claim 13, wherein the sheet has a thickness between 0.8-1.5 mm.

18. The sheet of claim 1, wherein the diffusing particles have a particle size less than or equal to 10 micrometers (μm).

19. The LED lighting system of claim 12, wherein the diffusing particles have a particle size less than or equal to 10 micrometers (μm).

20. The sheet of claim 18, wherein the diffusing particles have a particle size less than or equal to 10 micrometers (μm).

* * * * *